US009726251B2

(12) United States Patent
Nagasawa et al.

(10) Patent No.: US 9,726,251 B2
(45) Date of Patent: *Aug. 8, 2017

(54) VIBRATION ISOLATOR

(71) Applicant: BRIDGESTONE CORPORATION, Tokyo (JP)

(72) Inventors: Masakazu Nagasawa, Yokohama (JP); Akira Ueki, Yokohama (JP); Shuhei Ono, Yokohama (JP); Yasuyuki Nagashima, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/824,616

(22) Filed: Aug. 12, 2015

(65) Prior Publication Data
US 2016/0053844 A1    Feb. 25, 2016

(30) Foreign Application Priority Data

Aug. 20, 2014  (JP) ................ 2014-167274

(51) Int. Cl.
*F16F 5/00* (2006.01)
*F16F 13/08* (2006.01)
(Continued)

(52) U.S. Cl.
CPC ............ *F16F 13/08* (2013.01); *B60K 5/1208* (2013.01); *F16F 13/106* (2013.01)

(58) Field of Classification Search
CPC ........ F16F 13/08; F16F 13/106; F16F 9/3207; F16F 9/3484; F16F 15/04; B60K 5/1208
(Continued)

(56) References Cited

U.S. PATENT DOCUMENTS 4,700,931 A    10/1987  Eberhard et al.
4,742,999 A *   5/1988  Flower .................. F16F 13/106
                                                  188/320
(Continued)

FOREIGN PATENT DOCUMENTS

EP    0 262 544 A2    4/1988
JP    58-72740 A      4/1983
(Continued)

OTHER PUBLICATIONS

International Search Report dated Aug. 25, 2015 issued in counterpart application No. PCT/JP2015/070426.
(Continued)

*Primary Examiner* — Melody Burch
(74) *Attorney, Agent, or Firm* — Sughrue Mion, PLLC

(57)  ABSTRACT

A vibration isolator includes first and second mounting members; an elastic body connecting the mounting members; a partition member partitioning a liquid chamber in the first mounting member into a primary liquid chamber using the elastic body as a part of a wall surface thereof and a secondary liquid chamber; and a movable member housed in a housing chamber provided within the partition member, the movable member being deformable or displaceable in an axial direction of the first mounting member. The partition member includes communicating holes that extend from a portion of the partition member which is exposed to the primary liquid chamber or the secondary liquid chamber toward an inside of the partition member and are opened toward the movable member. The partition member is equipped with partition plate parts dividing the housing chamber from the primary liquid chamber and dividing the housing chamber from the secondary liquid chamber.

7 Claims, 12 Drawing Sheets

(51) Int. Cl.
*B60K 5/12* (2006.01)
*F16F 13/10* (2006.01)
*F16M 1/00* (2006.01)

(58) Field of Classification Search
USPC .............................. 267/136, 140.13, 140.14
See application file for complete search history.

(56) References Cited

U.S. PATENT DOCUMENTS

| | | | | |
|---|---|---|---|---|
| 4,762,309 | A * | 8/1988 | Hutchins | F16F 13/106 137/513.5 |
| 4,915,365 | A | 4/1990 | Lee | |
| 5,020,782 | A | 6/1991 | Freudenberg et al. | |
| 5,240,233 | A * | 8/1993 | Kato | F16F 13/10 267/140.13 |
| 5,443,245 | A * | 8/1995 | Bellamy | F16F 13/106 267/140.13 |
| 6,357,730 | B1 | 3/2002 | Gugsch et al. | |
| 6,631,893 | B2 * | 10/2003 | Hermann | F16F 13/264 267/140.13 |
| 7,258,331 | B2 | 8/2007 | Schneider | |
| 7,802,777 | B2 | 9/2010 | Katayama et al. | |
| 8,998,187 | B2 | 4/2015 | Bradshaw et al. | |
| 2002/0043748 | A1 | 4/2002 | Meyer | |
| 2005/0206056 | A1 | 9/2005 | Maeno et al. | |
| 2006/0001204 | A1 | 1/2006 | Kato et al. | |
| 2006/0071381 | A1 | 4/2006 | Hatakeyama et al. | |
| 2007/0138718 | A1 * | 6/2007 | Muraoka | F16F 13/105 267/140.14 |
| 2008/0290573 | A1 | 11/2008 | Katayama et al. | |
| 2009/0283945 | A1 * | 11/2009 | Kojima | F16F 13/18 267/140.13 |
| 2010/0102495 | A1 * | 4/2010 | Okumura | F16F 13/108 267/140.13 |
| 2016/0053845 | A1 | 2/2016 | Ueki et al. | |
| 2016/0053846 | A1 * | 2/2016 | Nagasawa | B60K 5/1208 267/140.13 |

FOREIGN PATENT DOCUMENTS

| | | |
|---|---|---|
| JP | 60-24957 U | 2/1985 |
| JP | 61-2938 A | 1/1986 |
| JP | 2006-17134 A | 1/2006 |
| JP | 2008-291869 A | 12/2008 |
| JP | 2009-002478 A | 1/2009 |
| JP | 2013-210093 A | 10/2013 |

OTHER PUBLICATIONS

International Search Report dated Sep. 8, 2015 issued in counterpart application No. PCT/JP2015/070644.
Office Action dated Jul. 22, 2016 from the United States Patent and Trademark Office in corresponding U.S. Appl. No. 14/820,867.
Communication dated Mar. 30, 2017, from the United States Patent and Trademark Office in counterpart U.S. Appl. No. 14/820,867.
Communication dated Mar. 15, 2017 from U.S. Patent & Trademark Office in counterpart U.S. Appl. No. 14/820,867.

* cited by examiner

VIBRATION ISOLATOR

BACKGROUND OF THE INVENTION

Field of the Invention

The present invention relates to a vibration isolator that is applied to, for instance, a motor vehicle or an industrial machine to absorb and attenuate vibrations of a vibration generator such as an engine.

Priority is claimed on Japanese Patent Application No. 2014-167274, filed Aug. 20, 2014, the content of which is incorporated herein by reference.

Description of Related Art

For example, a vibration isolator described in Japanese Unexamined Patent Application, First Publication No. 2009-2478 is known. The vibration isolator is equipped with a tubular first mounting member that is connected to one of a vibration generator and a vibration absorber, a second mounting member that is connected to the other of the vibration generator and the vibration absorber, an elastic body that connects the mounting members, a partition member that partitions a liquid chamber in the first mounting member within which a liquid is enclosed into a primary liquid chamber using the elastic body as a part of a wall surface thereof and a secondary liquid chamber, and a movable member that is housed in a housing chamber provided within the partition member, the movable member being free to be deformed or displaced in an axial direction of the first mounting member. The partition member is provided with a plurality of communicating holes that extend inward in the axial direction from a portion of the partition member which is exposed to the primary liquid chamber or the secondary liquid chamber and that that open toward the movable member the movable member.

SUMMARY OF THE INVENTION

Incidentally, in the conventional vibration isolator, when vibration is input and a liquid circulates through the communicating holes, if resonance occurs in the communicating holes, the movable member is greatly deformed or displaced in the housing chamber in the axial direction, and resonance magnification is increased. The vibration isolation characteristics of the vibration isolator may be deteriorated.

In order to inhibit the deterioration of such vibration isolation characteristics of the vibration isolator, employing a constitution for narrowing an axial interval between the movable member and a wall surface of the housing chamber and regulating axial deformation or displacement of the movable member in the housing chamber may be considered. However, in this case, high-precision dimension management is required, and there are many design restrictions. In addition, when a large amplitude of vibration is input, abnormal noises may occur, for instance, because the movable member collides with the wall surface of the housing chamber, and the vibration isolation characteristics of the vibration isolator may be deteriorated.

As a result of intensive studies, the inventors of the present invention found that by providing numerous pore-like communicating holes in the partition member, the force of the liquid circulating through the communicating holes can be weakened while the opening area of all of the communicating holes is secured, and that the resonance magnification of the resonance caused by the communicating holes can be reduced without narrowing the axial interval between the movable member and the wall surface of the housing chamber.

That is, in the conventional vibration isolator, there is room for improvement in forming more communicating holes.

The present invention has been made in consideration of the aforementioned circumstances and an object of the present invention is to enable formation of more communicating holes.

To solve the above problems, the present invention proposes the following means.

A vibration isolator according to the present invention includes: a first mounting member having a tubular shape and connected to one of a vibration generator and a vibration absorber, and a second mounting member connected to the other of the vibration generator and the vibration absorber; an elastic body configured to connect the mounting members; a partition member disposed within the first mounting member and configured to partition a liquid chamber within which a liquid is enclosed into a primary liquid chamber using the elastic body as a part of a wall surface thereof and a secondary liquid chamber; and a movable member housed in a housing chamber provided within the partition member, the movable member being free to be deformed or displaced in an axial direction of the first mounting member. The partition member is provided with a plurality of communicating holes that extend from a portion of the partition member which is exposed to the primary liquid chamber or the secondary liquid chamber toward an inside of the partition member and are open toward the movable member. The partition member is equipped with partition plate parts of which front and back surfaces are directed in the axial direction of the first mounting member, the partition plate parts dividing the housing chamber from the primary liquid chamber and dividing the housing chamber from the secondary liquid chamber, and the partition plate parts bulging outward. The communicating holes pass through the partition plate parts.

In this case, the partition plate parts bulge outward in the axial direction, and the communicating holes pass through the partition plate parts in the axial direction. Accordingly, for example, in comparison with the case in which the partition plate parts are formed in a flat plate shape extending in a direction perpendicular to an axis of the first mounting member without bulging in the axial direction, many communicating holes can be formed.

The bulging partition plate parts may be formed in a spherical (i.e., dome) shape.

The communicating holes may be formed in a tapered shape; and large-diameter openings of the plurality of communicating holes is commonly opened to front surfaces of the partition plate parts which face an outside in the axial direction or to back surfaces of the partition plate parts which face an inside of the axial direction.

A vibration isolator according to the present invention includes: a first mounting member having a tubular shape and connected to one of a vibration generator and a vibration absorber, and a second mounting member connected to the other of the vibration generator and the vibration absorber; an elastic body configured to connect the first and second mounting members; a partition member disposed within the first mounting member and configured to partition a liquid chamber within which a liquid is enclosed into a primary liquid chamber using the elastic body as a part of a wall surface thereof and a secondary liquid chamber; and a movable member housed in a housing chamber provided within the partition member, the movable member being free to be deformed or displaced in an axial direction of the first mounting member. The partition member is provided with a plurality of communicating holes that extend from a portion of the partition member which is exposed to the primary liquid chamber or the secondary liquid chamber toward an inside of the partition member and are opened toward the movable member. The partition member comprises: partition plate parts with front and back surfaces, said partition plates separating the housing chamber from one of the primary liquid chamber and the secondary liquid chamber in the axial direction; and protrusions that protrude outwardly from the partition plate parts, said protrusions being disposed to cover base holes passing through the partition plate parts. The communicating holes pass through each protrusion, and the communicating holes are arrayed circumferentially around an axis of the base hole, and are open to the movable member through the base holes.

In this case, the communicating holes pass through the protrusions in the axial direction, and the plurality of communicating holes are provided for the protrusion around an axis of the base hole, and are opened to the movable member through the base holes. Accordingly, for example, a liquid pressure of the liquid circulating through the communicating holes can be reliably exerted on the movable member through the base holes. Further, for example, in comparison with the case in which the communicating holes merely pass through the partition plate parts in the axial direction, many communicating holes can be formed.

The base hole may be formed in a circular or a hexagonal shape when viewed along an axis of the first mounting member.

DETAILED DESCRIPTION OF THE INVENTION

First Embodiment

Next, a vibration isolator of a first embodiment according to the present invention will be described with reference to FIGS. 1 and 2.

Figure 1:
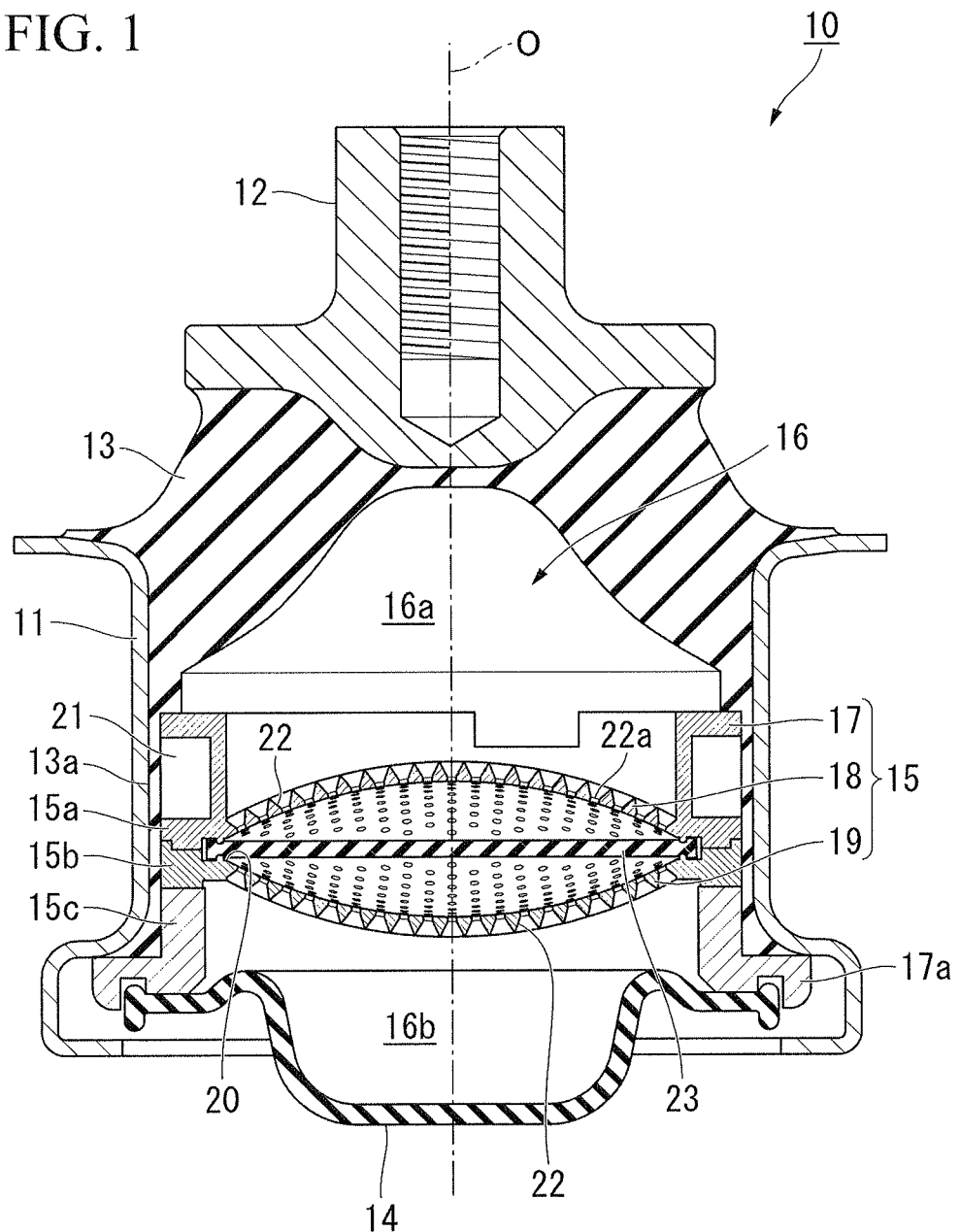
FIG. 1 is a longitudinal sectional view of a vibration isolator according to a first embodiment of the present invention.

As shown in FIG. 1, the vibration isolator 10 is equipped with a tubular first mounting member 11 that is connected to one of a vibration generator and a vibration absorber, a second mounting member 12 that is connected to the other of the vibration generator and the vibration absorber, an elastic body 13 that elastically connects the first mounting member 11 and the second mounting member 12, and a partition member 15 that is disposed inside the first mounting member 11 and partitions a liquid chamber 16 formed inside the first mounting member 11 into a primary liquid chamber 16a and a secondary liquid chamber 16b.

Each of these members is provided coaxially with a central axis O. Hereinafter, a direction along the central axis O is referred to as an axial direction (axial direction of the first mounting member), a direction perpendicular to the central axis O is referred to as a radial direction (radial direction of the first mounting member), and a direction around the central axis O is referred to as a circumferential direction (circumferential direction of the first mounting member).

Here, the aforementioned liquid chamber 16 is partitioned into the primary liquid chamber 16a that uses the elastic body 13 as a part of a wall surface thereof and is located at one side (upper side in FIG. 1) in the axial direction, and the secondary liquid chamber 16b that is located at the other side (lower side in FIG. 1) in the axial direction by the partition member 15.

The primary liquid chamber 16a and the secondary liquid chamber 16b are enclosed with a liquid such as ethylene glycol, water, or silicone oil.

The vibration isolator 10 is mounted on, for instance, a motor vehicle, and inhibits vibration of an engine from being transmitted to a vehicle body. In the vibration isolator 10, the second mounting member 12 is connected to the engine (not shown) acting as the vibration generator, whereas the first mounting member 11 is connected to the vehicle body acting as the vibration absorber via a bracket (not shown).

The second mounting member 12 is disposed at one side in the axial direction relative to the first mounting member 11.

The elastic body 13 is vulcanized and adhered to an inner circumferential surface of an end of the first mounting member 11, the end of which is located at the one side in the axial direction. The end of the first mounting member 11 which is located at the one side in the axial direction is blocked in a liquid-tight state by the elastic body 13.

The elastic body 13 is a member formed of, for instance, a resin material such as rubber. The elastic body 13 is directed to the one side in the axial direction so as to get away from the end of the first mounting member 11, and is formed in a truncated cone shape in which it is gradually reduced in diameter toward the one side of the first mounting member 11 in the axial direction.

In the shown example, the elastic body 13 is integrally formed with a cover part 13a that covers an entire inner circumferential surface of the first mounting member 11. The cover part 13a extends from the elastic body 13 toward the other side of the first mounting member 11 in the axial direction along the inner circumferential surface of the first mounting member 11, and is vulcanized and adhered to the inner circumferential surface of the first mounting member 11.

Figure 2:
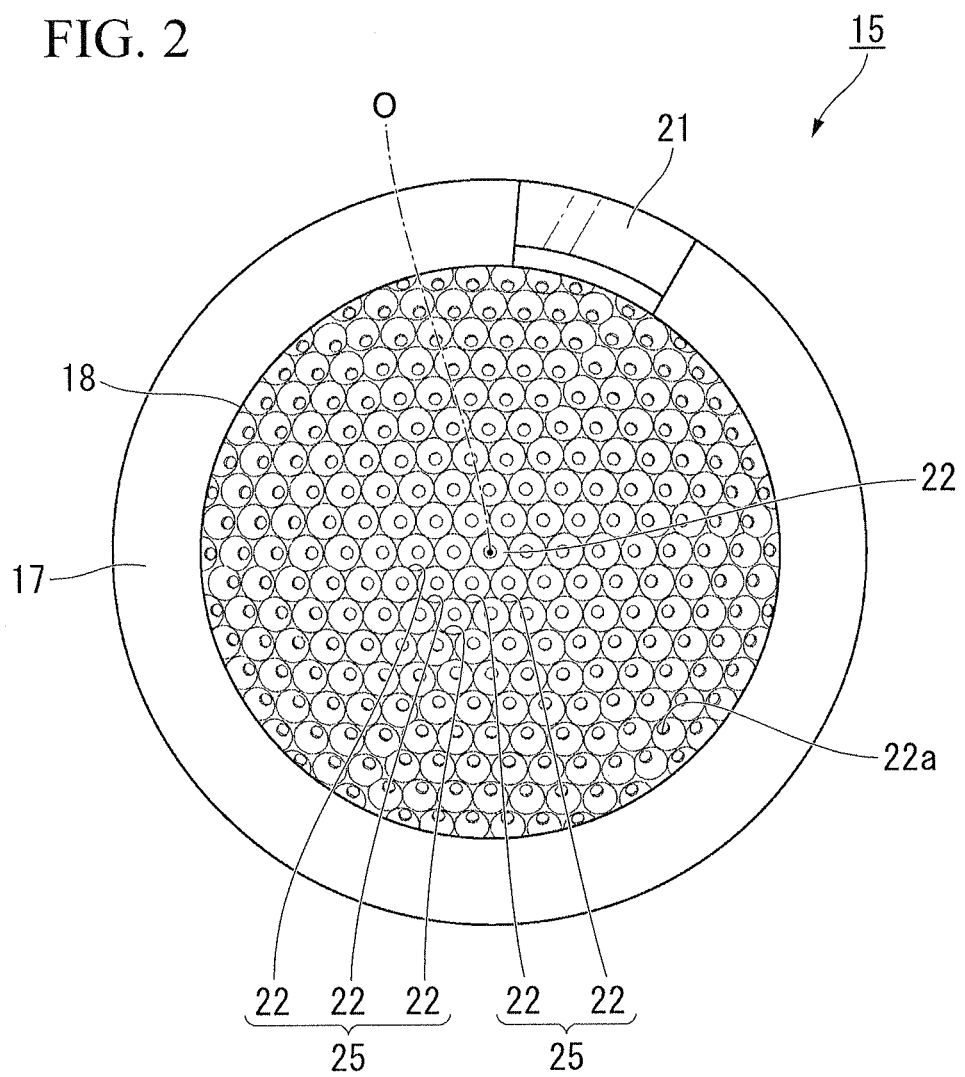
FIG. 2 is a top view of a partition member constituting the vibration isolator shown in FIG. 1.

As shown in FIGS. 1 and 2, the partition member 15 is integrally formed of, for example, an aluminum alloy or a resin. The partition member 15 is equipped with a mounting tube part 17 and partition plate parts 18 and 19.

The mounting tube part 17 is mounted in the first mounting member 11. The mounting tube part 17 is disposed coaxially with the central axis O, and is fitted into a portion located at the other side in the axial direction relative to a portion to which the elastic body 13 is vulcanized and adhered at the first mounting member 11. The mounting tube part 17 is fitted into the first mounting member 11 via the cover part 13a in a liquid-tight state.

An end of the mounting tube part 17 which is located at the other side in the axial direction is blocked in a liquid-tight state by a diaphragm 14. The diaphragm 14 is fixed to the mounting tube part 17 from the other side in the axial direction. The mounting tube part 17 is provided with a flange 17a protruding outward in the radial direction, and the diaphragm 14 is fixed to the flange 17a in a liquid-tight state. Thereby, a liquid is configured to be enclosable within the liquid chamber 16 that is inside the first mounting member 11 and is located between the elastic body 13 and the diaphragm 14.

The partition plate parts 18 and 19 block an interior of the mounting tube part 17, thereby forming a housing chamber 20 in the mounting tube part 17. Front and back surfaces of the partition plate parts 18 and 19 are directed to the axial direction, and the partition plate parts 18 and 19 are disposed coaxially with the central axis O. The partition plate parts 18 and 19 bulge in the axial direction and are formed in a spherical shape. Thicknesses of the partition plate parts 18 and 19, which are sizes taken in the axial direction of the partition plate parts 18 and 19, are each, for instance, 5 mm or less, and preferably 2 mm or more and 5 mm or less.

The partition plate parts 18 and 19 are provided in a pair at an interval in the axial direction, and the housing chamber 20 is formed between the partition plate parts 18 and 19. The partition plate parts 18 and 19 include a first partition plate part 18 that divides the housing chamber 20 and the primary liquid chamber 16a in the axial direction and a second partition plate part 19 that divides the housing chamber 20 and the secondary liquid chamber 16b in the axial direction. Both of these partition plate parts 18 and 19 bulge toward the outside (the opposite side of the housing chamber) in the axial direction of the partition plate parts 18 and 19, and are formed in shapes that are inverse to each other in the axial direction.

The partition member 15 is split into a plurality of split bodies 15a, 15b, and 15c in the axial direction.

In the shown example, the partition member 15 is split into the plurality of split bodies 15a, 15b, and 15c to split the housing chamber 20 in the axial direction. The split bodies 15a, 15b, and 15c include a first split body 15a having the first partition plate part 18, a second split body 15b having the second partition plate part 19, and a third split body 15c having the flange 17a.

The partition member 15 is provided with the housing chamber 20, the restriction passage 21, and the communicating holes 22.

The housing chamber 20 is circular from a top view in which the partition member 15 is viewed in the axial direction, and is disposed coaxially with the central axis O. The outer diameter of the housing chamber 20 is greater than those of the partition plate parts 18 and 19. The size of the housing chamber 20 taken in the axial direction is gradually increased from the outside toward the inside of the housing chamber 20 in the radial direction.

A movable member (a movable plate or a membrane) 23 is disposed in the housing chamber 20. The movable member 23 is housed in the housing chamber 20 to be deformable in the axial direction. The movable member 23 is formed of, for instance, a resin material such as rubber in a plate shape of which front and back surfaces are directed to the axial direction, and is configured to be elastically deformable. The movable member 23 is axially deformed according to a pressure difference between the primary liquid chamber 16a and the secondary liquid chamber 16b. The movable member 23 is formed in a flat plate shape in which it extends in the direction perpendicular to the central axis O. An outer circumferential edge of the movable member 23 is fixed to the partition member 15 in the axial direction. A gap is provided in the axial direction between a portion of the movable member 23 which is located inside relative to the outer circumferential edge thereof and a wall surface of the housing chamber 20.

The restriction passage 21 communicates the primary liquid chamber 16a and the secondary liquid chamber 16b with each other. The restriction passage 21 extends along an outer circumferential surface of the partition member 15 in the circumferential direction, and is disposed to avoid the housing chamber 20. The restriction passage 21 is tuned such that, when engine shake vibration with a frequency of, for instance, about 10 Hz is input, resonance (liquid column resonance) is generated.

The communicating holes 22 extend from a portion of the partition member 15 which is exposed to the primary liquid chamber 16a or the secondary liquid chamber 16b toward the inside (side of the housing chamber) in the axial direction, and are opened toward the movable member 23. The plurality of communicating holes 22 are provided for each of the first partition plate part 18 and the second partition plate part 19. All the communicating holes 22 are formed in the same shape and size.

The communicating holes 22 pass through the partition plate parts 18 and 19 in the axial direction, and directly connect the primary liquid chamber 16a or the secondary liquid chamber 16b and the housing chamber 20. The communicating holes 22 are circular from a top view in which that partition member 15 is viewed in the axial direction, and are formed as perfect circles from a top view. The communicating holes 22 are formed in a tapered shape extending in the axial direction. All large-diameter openings of openings of both ends of the plurality of communicating holes 22 are commonly opened to surfaces of the partition plate parts 18 and 19 which are directed to the outside in the axial direction. The communicating holes 22 are gradually reduced in diameter toward the inside in the axial direction. The ends of the communicating holes 22 which are located inside in the axial direction are formed with equidiametrical portions 22a at which inner diameters of the communicating holes 22 are the same regardless of the position in the axial direction.

The minimum inner diameter of each communicating hole 22, i.e. an inner diameter of a small-diameter opening (equidiametrical portion 22a) of both end openings of each communicating hole 22, may be 3.6 mm or less.

As shown in FIG. 2, the communicating holes 22 are disposed to be externally tangent to each other throughout the partition plate parts 18 and 19. The communicating holes 22 are disposed over the entire circumference in the circumferential direction, thereby constituting annular communicating hole arrays 25 formed coaxially with the central axis O. Each communicating hole array 25 forms a regular hexagon having six sides from a top view. The plurality of communicating hole arrays 25 are provided and differ in diameter. All of the plurality of communicating hole arrays 25 are similar in shape.

The number of the communicating holes 22 constituting one side in one communicating hole array 25 is one more than that of the communicating holes 22 constituting one side in another communicating hole array 25 adjacent to the one communicating hole array 25 from the inside in the radial direction. In the communicating hole arrays 25 adjacent to each other in the radial direction, the communicating holes 22 that form the respective sides are disposed so as to alternate with each other in the circumferential direction.

One communicating hole 22 disposed coaxially with the central axis O is provided inside the communicating hole arrays 25 whose diameter is smallest among the plurality of communicating hole arrays 25.

The plurality of communicating holes 22 are disposed at each of the first and second partition plate parts 18 and 19 to form the communicating hole arrays 25 having the same shape and size. In the communicating hole arrays 25 with equal diameters at the respective first and second partition plate parts 18 and 19, positions of the communicating holes 22 in the circumferential direction are the same.

Next, an operation of the vibration isolator 10 configured in this way will be described.

When vibration (for example, idle vibration with a frequency of about 30 Hz) having minute amplitude (for example, ±0.2 mm or less) is applied to the vibration isolator 10 and a pressure of a liquid in the primary liquid chamber 16a is changed, the movable member 23 is deformed in the housing chamber 20 in the axial direction. Thereby, the vibration can be absorbed and attenuated.

Also, when vibration (for example, engine shake vibration with a frequency of about 10 Hz) having greater amplitude than the aforementioned minute amplitude is applied to the vibration isolator 10 and the pressure of the liquid in the primary liquid chamber 16a is changed, the movable member 23 comes into contact with the wall surface of the housing chamber 20 at the partition member 15 and blocks the communicating holes 22. At this time, the liquid circulates through the restriction passage 21 between the primary liquid chamber 16a and the secondary liquid chamber 16b, and liquid column resonance occurs. Thereby, the vibration can be absorbed and attenuated.

As described above, in the vibration isolator 10 according to the present embodiment, the partition plate parts 18 and 19 bulge in the axial direction, and the communicating holes 22 pass through the partition plate parts 18 and 19 in the axial direction. Accordingly, for example, in comparison with the case in which the partition plate parts 18 and 19 are formed in a flat plate shape extending in a direction perpendicular to the central axis O without bulging in the axial direction, many communicating holes 22 can be formed.

In addition, since the partition plate parts 18 and 19 are formed in the spherical shapes, many communicating holes 22 can be formed, for example, in comparison with the case in which the partition plate parts 18 and 19 are formed in conical shapes.

Further, large-diameter openings of the plurality of communicating holes 22 are commonly opened to surfaces of the partition plate parts 18 and 19 which are directed to the outside in the axial direction, and thus many communicating holes 22 can be formed while stabilizing the characteristics of the vibration isolator 10.

Second Embodiment

Next, a vibration isolator of a second embodiment according to the present invention will be described with reference to FIG. 3.

In the second embodiment, the same parts as the components in the first embodiment are given the same symbols, and a description thereof will be omitted. Only differences will be described.

Figure 3:
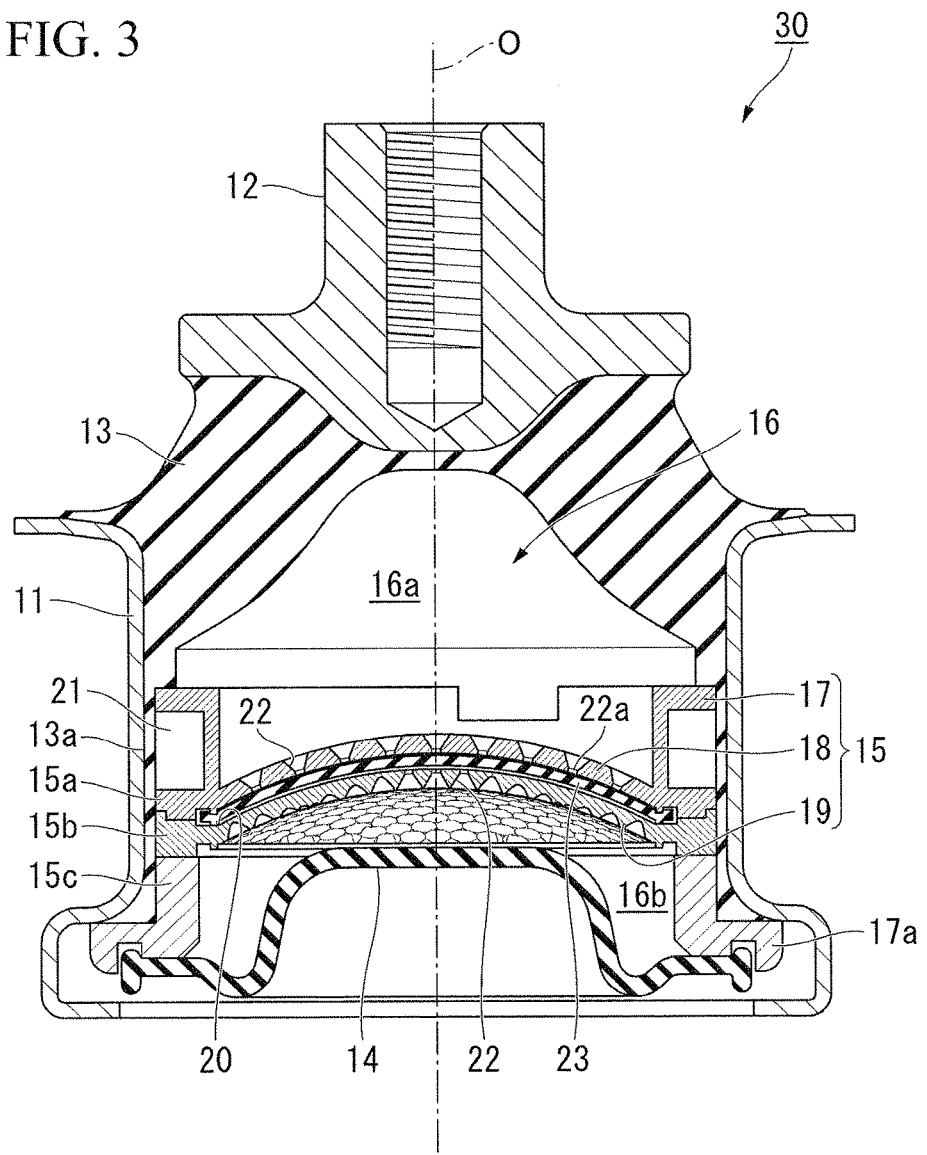
FIG. 3 is a longitudinal sectional view of a vibration isolator according to a second embodiment of the present invention.
Figure 4:
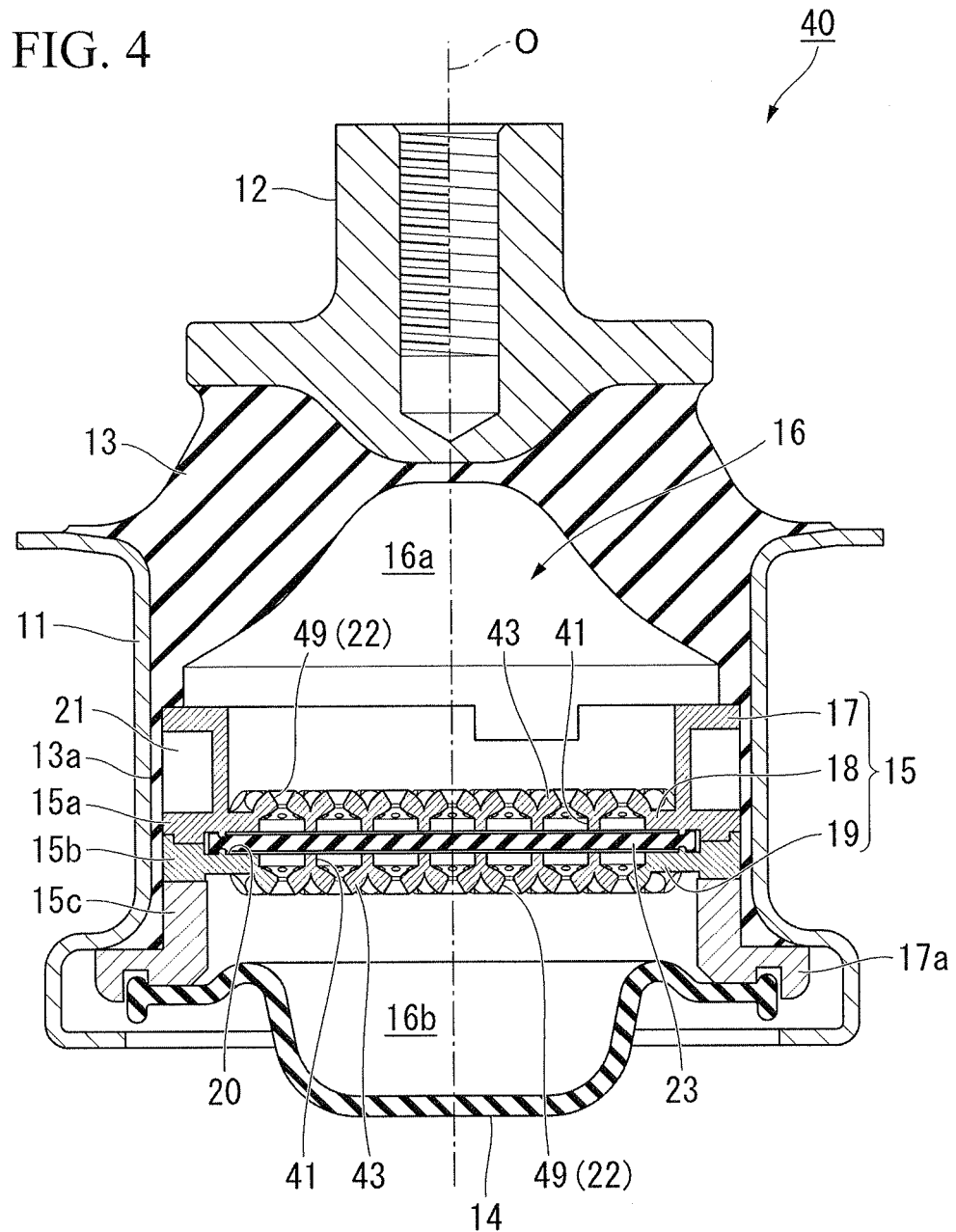
FIG. 4 is a longitudinal sectional view of a vibration isolator according to a third embodiment of the present invention.

As shown in FIG. 3, in the vibration isolator 30 according to the present embodiment, a first partition plate part 18 and a second partition plate part 19 are formed in the same shape and size. Both of the partition plate parts 18 and 19 bulge toward one side in the axial direction. Thereby, a housing chamber 20 formed by both the partition plate parts 18 and 19 is also formed in a spherical shape that bulges toward one side in the axial direction. The size of the housing chamber 20 in the axial direction is uniform throughout the housing chamber 20.

In the vibration isolator 30 according to the present embodiment, the same operation and effects as the vibration isolator 10 according to the first embodiment can be produced.

Third Embodiment

Next, a vibration isolator of a third embodiment according to the present invention will be described with reference to FIGS. 4 to 7.

In the third embodiment, the same parts as the components in the first embodiment are given the same symbols, and description thereof will be omitted. Only differences will be described.

As shown in FIGS. 4 to 7, in the vibration isolator 40 according to the present embodiment, instead of bulging partition plate parts 18 and 19 in the axial direction, the partition plate parts 18 and 19 are formed in a flat plate shape extending in a direction perpendicular to a central axis O. The first partition plate part 18 and the second partition plate part 19 are formed in the same shape and size.

Also, in the present embodiment, instead of forming communicating holes 22 in the partition plate parts 18 and 19, the partition plate parts 18 and 19 are provided with base holes 41. The plurality of base holes 41 are provided for each of the first partition plate part 18 and the second partition plate part 19. All the base holes 41 are formed in the same shape and size.

The base holes 41 pass through the partition plate parts 18 and 19 in the axial direction. The base holes 41 are circular from a top view in which a partition member 15 is viewed in the axial direction, and a shape of each base hole 41 when viewed from above is a perfect circle. The base holes 41 are formed with the same diameter throughout the length in the axial direction.

The base holes 41 are disposed throughout the partition plate parts 18 and 19. The base holes 41 are disposed throughout the circumference in a circumferential direction, thereby constituting annular base hole arrays 42 formed coaxially with the central axis O. Each base hole array 42 forms a regular hexagon from a top view. The plurality of base hole arrays 42 are provided with different diameters. The plurality of base hole arrays 42 are similar in shape.

The number of the base holes 41 constituting one side in one base hole array 42 is one more than that of the base holes 41 constituting one side in another base hole array 42 adjacent to the one base hole array 42 from the inside in a radial direction. In the base hole arrays 42 adjacent to each other in the radial direction, the base holes 41 forming the respective sides are disposed to alternate with each other in the circumferential direction.

One base hole 41 disposed coaxially with the central axis O is provided inside the base hole array 42 whose diameter is smallest among the plurality of base hole arrays 42.

The plurality of base holes 41 are disposed at each of the first and second partition plate parts 18 and 19 to form the base hole arrays 42 having the same shape and size. In the base hole arrays 42 formed in the respective first and second partition plate parts 18 and 19 with the same size, positions of the base holes 41 in the circumferential direction are the same.

Further, in the present embodiment, the partition member 15 is equipped with protrusions 43 that are disposed to cover the base holes 41 and protrude from the partition plate parts 18 and 19 toward the outside in the axial direction. The protrusions 43 cover the base holes 41 from the outside in the axial direction. Each of the plurality of protrusions 43 is provided to correspond to one of the plurality of base holes 41. That is, one protrusion 43 is disposed to cover one base hole 41, and blocks one base hole 41.

Each protrusion 43 is formed in a hemispherical shape that bulges toward the outside in the axial direction. The protrusions 43 are disposed coaxially with a hole axis L of the base hole 41. The protrusions 43 block openings of the base holes 41 which are located outside in the axial direction. Outer circumferential edges of the protrusions 43 are connected across inner circumferential surfaces of the openings of the base holes 41 which are located outside in the axial direction and open peripheries of the base holes 41 on a surface of the partition plate part 18. Alternatively, the outer circumferential edges of the protrusions 43 may be connected exclusively to the surface of the partition plate part 18 or exclusively to the inner circumferential surfaces of the base holes 41.

An end face of each protrusion 43 which faces the inside in the axial direction is formed on a tapered surface 44 whose diameter is gradually reduced toward the outside in the axial direction. The tapered surface 44 is formed in a conical shape that bulges toward the outside in the axial direction. The tapered surface 44 forms an intermediate space 45 that continues to the base holes 41 from the outside in the axial direction.

Figure 7:
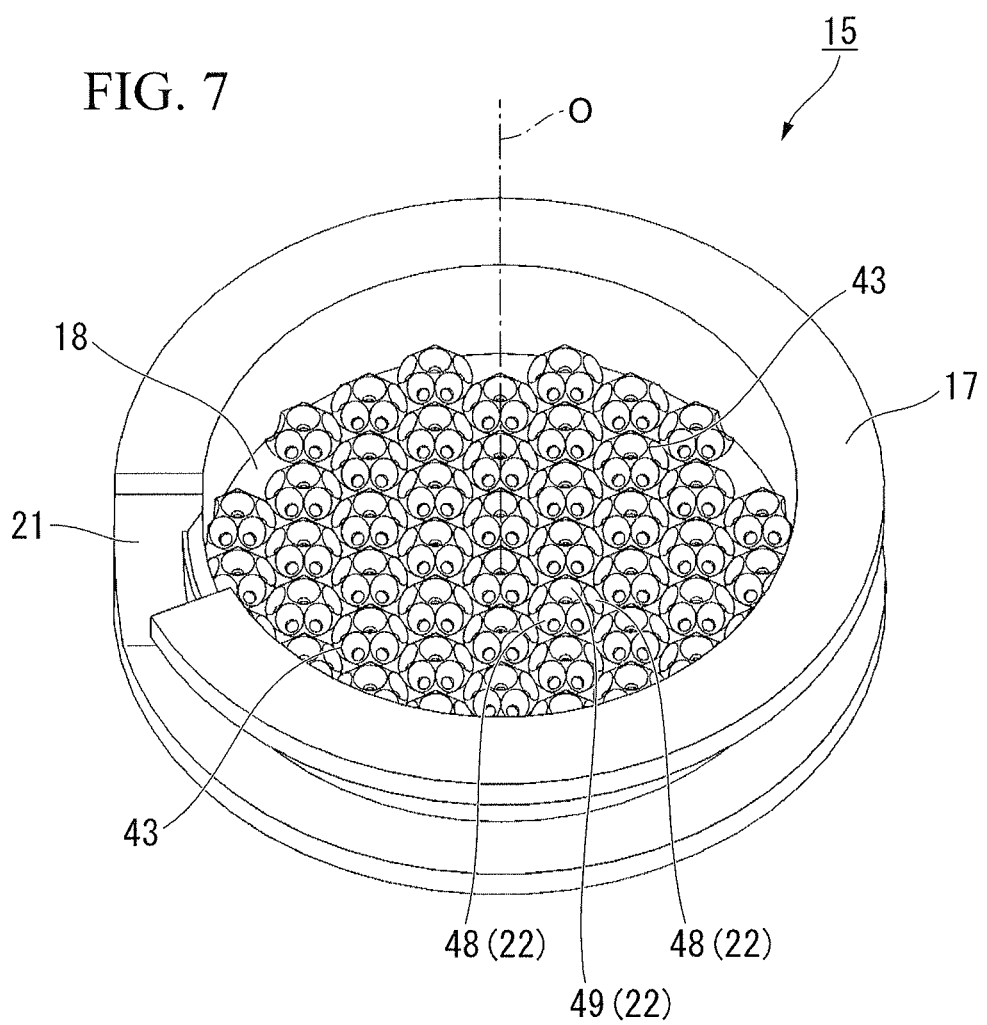
FIG. 7 is a perspective view of the partition member constituting the vibration isolator shown in FIG. 4.
Figure 8:
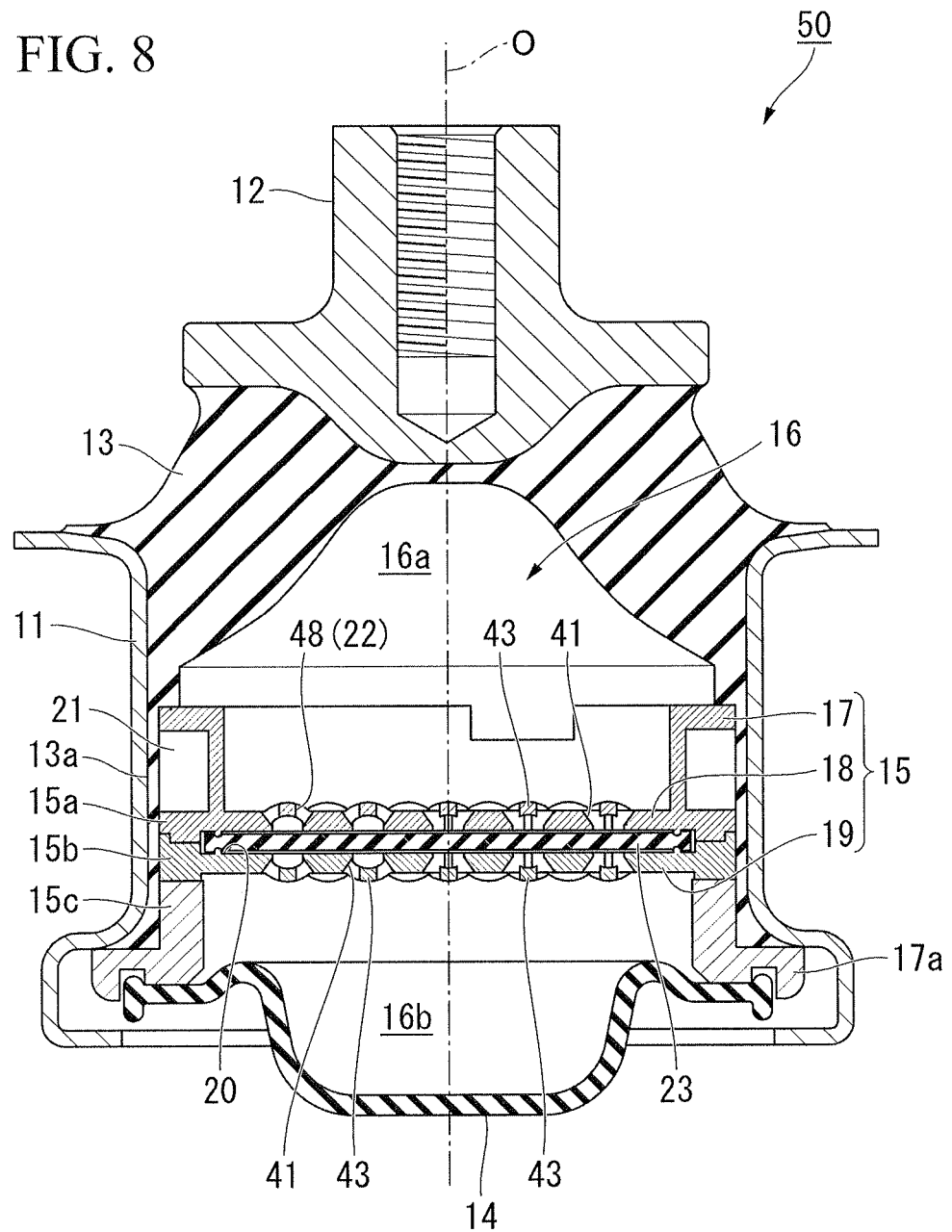
FIG. 8 is a longitudinal sectional view of a vibration isolator according to a fourth embodiment of the present invention.

As shown in FIG. 7, the plurality of protrusions 43 is disposed to be externally tangent to each other throughout the partition plate parts 18 and 19.

Figure 5:
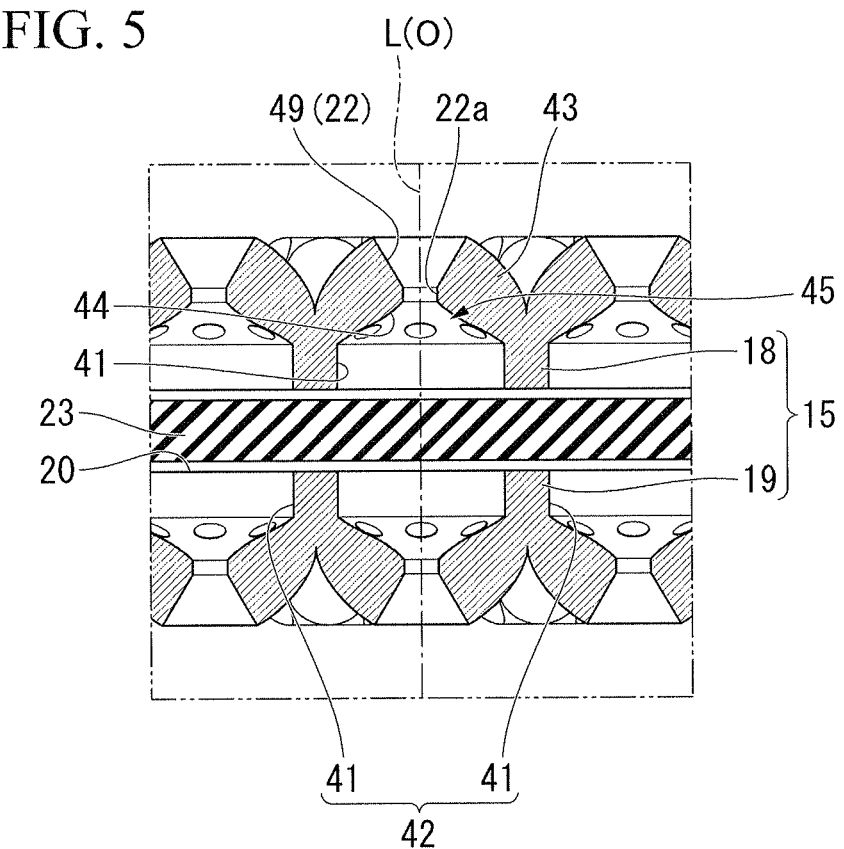
FIG. 5 is a longitudinal sectional view of an essential part of the vibration isolator shown in FIG. 4.
Figure 6:
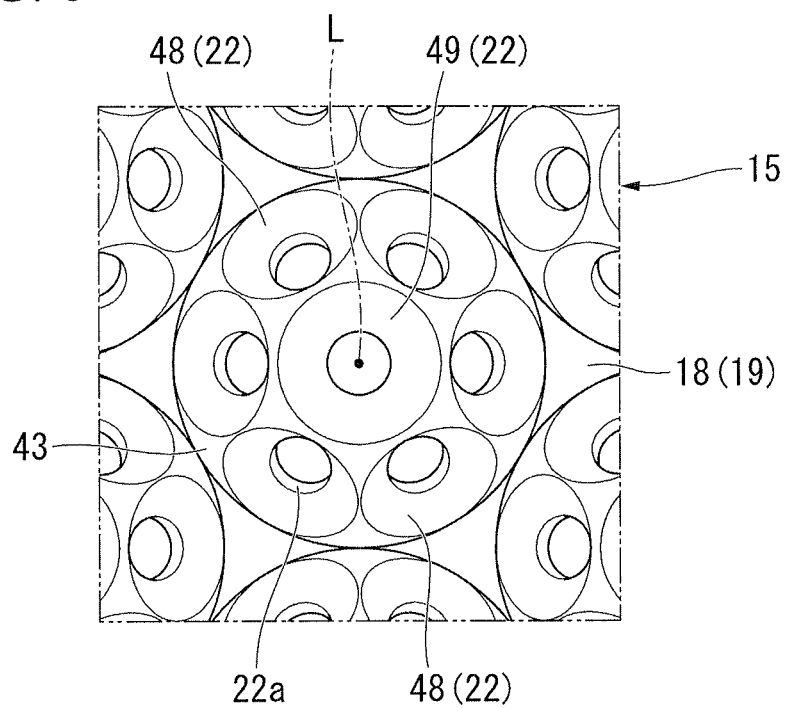
FIG. 6 is a top view of an essential part of a partition member constituting the vibration isolator shown in FIG. 4.

As shown in FIGS. 5 and 6, communicating holes 22 pass through the protrusions 43 in the axial direction, and are opened toward the movable member 23 through the intermediate spaces 45 and the base holes 41. Large-diameter openings of the communicating holes 22 are opened to surfaces of the protrusions 43 which face the outside in the axial direction. Equidiametrical portions 22a of the communicating holes 22 are opened to the tapered surfaces 44.

The plurality of communicating holes 22 are provided in the protrusions 43. In the present embodiment, the communicating holes 22 include a plurality of first communicating holes 48 provided around the hole axis L of the base hole 41 and a second communicating hole 49 provided on the hole axis L. One second communicating hole 49 is disposed coaxially with the hole axis L. Six axes of the first communicating holes 48 are inclined with respect to the hole axis L, and are disposed around the hole axis L.

As described above, in the vibration isolator 40 according to the present embodiment, the first communicating holes 48 pass through the protrusions 43 in the axial direction, and the plurality of first communicating holes 48 are provided in the protrusion 43 around the hole axis L of the base hole 41 and are opened toward the movable member 23 through the base holes 41. Accordingly, for example, a liquid pressure of a liquid circulating through the first communicating holes 48 can be reliably exerted on the movable member 23 through the base holes 41. Further, for example, in comparison with the case in which the communicating holes 22 merely pass through the partition plate parts 18 and 19 in the axial direction, many communicating holes 22 can be formed.

Fourth Embodiment

Next, a vibration isolator of a fourth embodiment according to the present invention will be described with reference to FIGS. 8 to 11.

In the fourth embodiment, the same parts as the components in the third embodiment are given the same symbols, and a description thereof will be omitted. Only differences will be described.

As shown in FIGS. 8 to 11, in the vibration isolator 50 according to the present embodiment, each base hole 41 has an angular shape from a top view, and has a hexagonal shape in the shown example. The base holes 41 are formed in a tapered shape extending in an axial direction. The large-diameter openings of openings of both ends of the plurality of base holes 41 are commonly opened to surfaces of the partition plate parts 18 and 19 which are directed to the outside in the axial direction. The base holes 41 are gradually reduced in diameter toward the inside in the axial direction. The ends of the base holes 41 which are located inside in the axial direction are formed with equidiametrical portions 41a at which inner diameters of the base holes 41 are the same regardless of the position in the axial direction.

An outer circumferential edge of each protrusion 43 is connected exclusively to portions of inner circumferential surfaces of the base holes 41 located outside in the axial direction relative to the equidiametrical portions 41a. A tapered surface 44 of each protrusion 43 is formed in a spherical shape that bulges toward the outside in the axial direction, and extends parallel to a surface of each protrusion 43.

Figure 10:
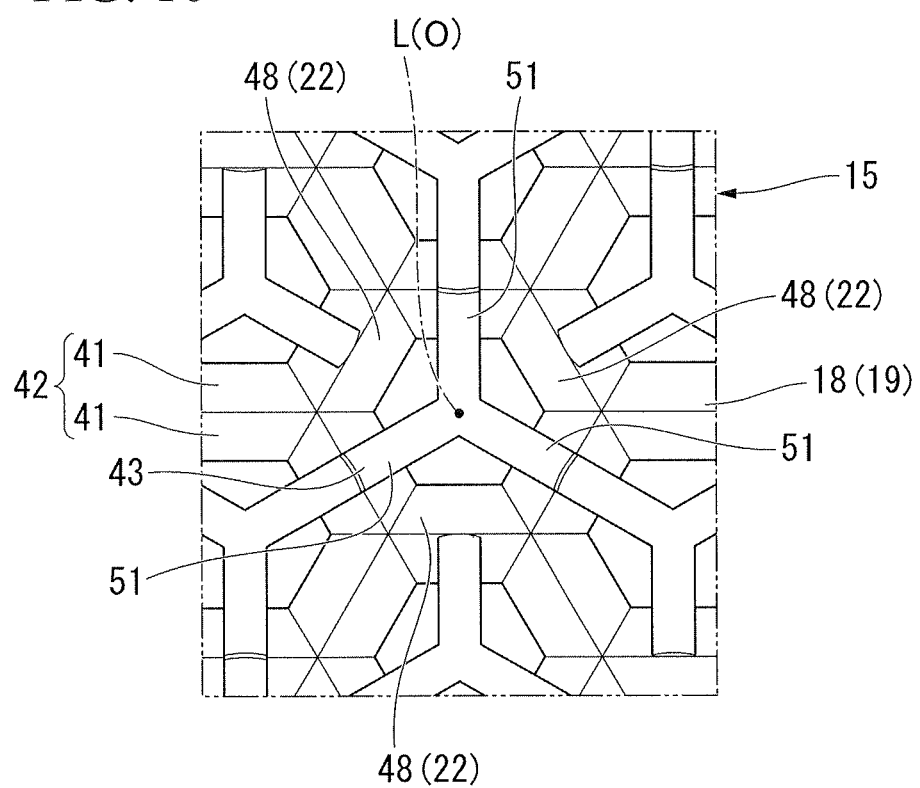
FIG. 10 is a top view of an essential part of a partition member constituting the vibration isolator shown in FIG. 8.
Figure 11:
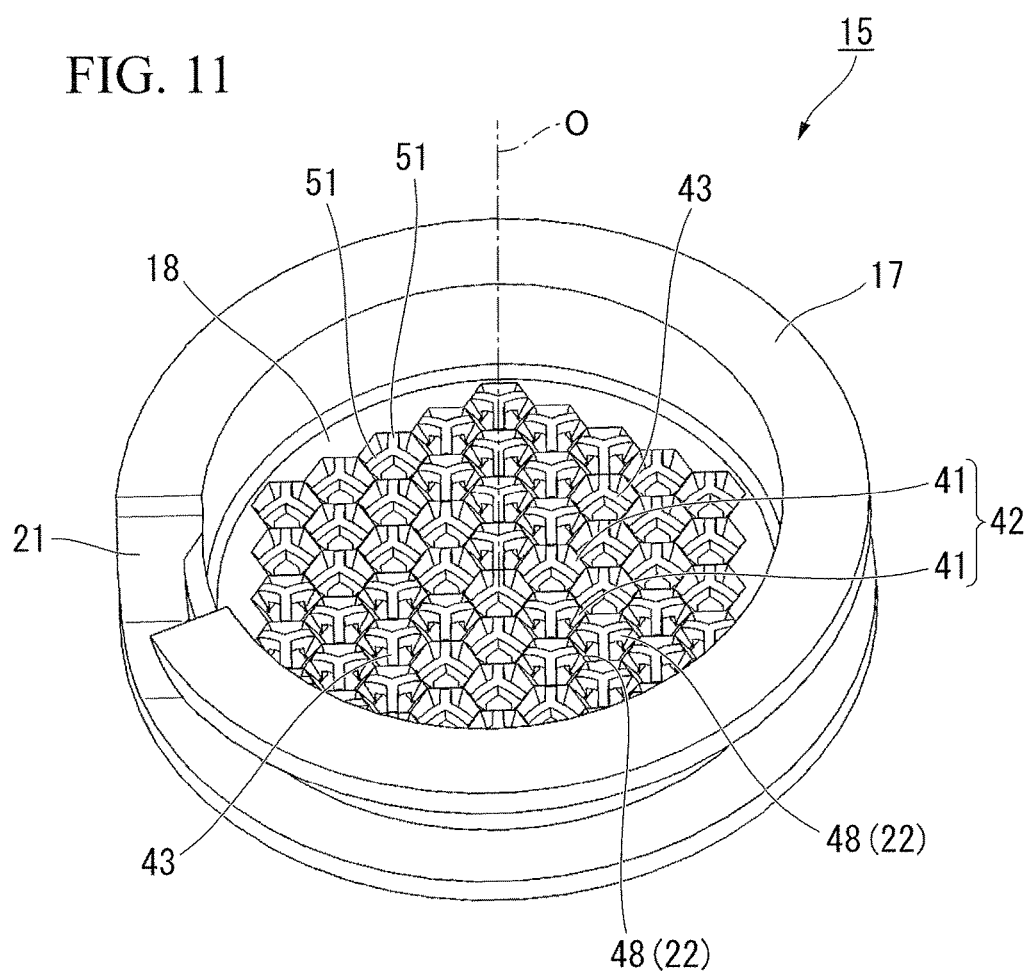
FIG. 11 is a perspective view of the partition member constituting the vibration isolator shown in FIG. 8.

As shown in FIG. 10, as communicating holes 22, only first communicating holes 48 are provided. The three first communicating holes 48 are arrayed circumferentially around an axis L of the base hole 41. The first communicating holes 48 are formed in the same shape and size. The first communicating holes 48 are formed in a pentagonal shape from a top view. A part of an inner circumferential surface of each first communicating hole 48 is configured by the inner circumferential surface of each base hole 41. In the top view, the first communicating holes 48 are formed in line symmetry based on a reference line that passes through a middle portion around the hole axis L and is perpendicular to the hole axis L.

A portion of the protrusion 43 which is located between the neighboring first communicating holes 48 around the hole axis L is formed as an arch portion 51 that extends in a straight line shape in a direction perpendicular to the hole axis L on a top view. Three arch portions 51 are disposed around the hole axis L at intervals. The arch portions 51 are connected to each other via the middle portion of the protrusion 43 which is located on the hole axis L.

Figure 9:
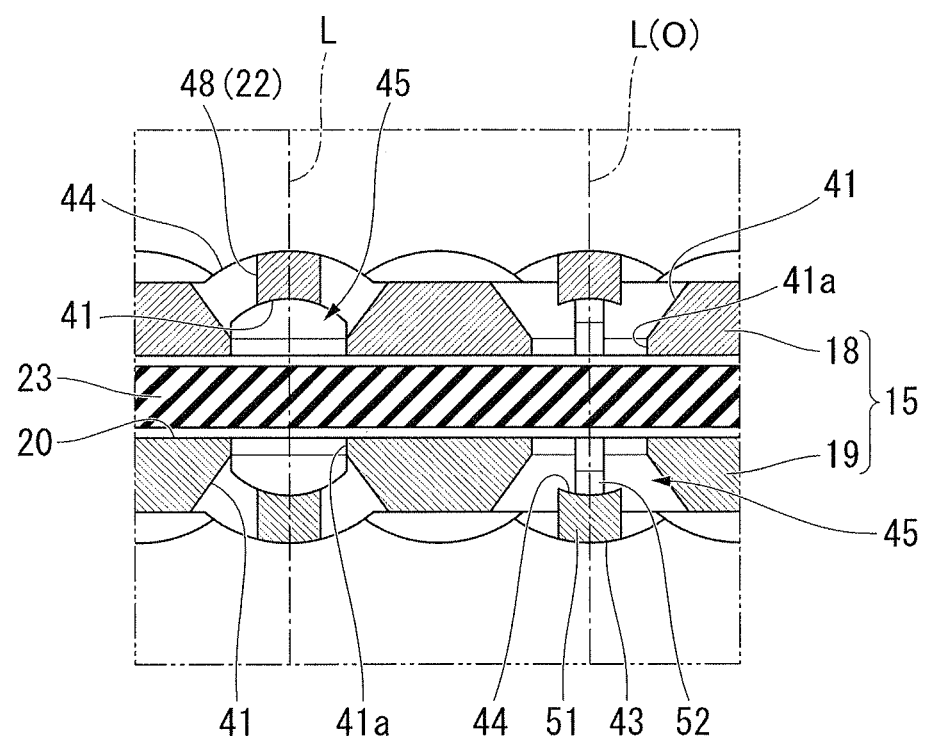
FIG. 9 is a longitudinal sectional view of an essential part of the vibration isolator shown in FIG. 8.

As shown in FIG. 9, a partition member 15 is provided with reinforcement portions 52 for reinforcing the arch portions 51. The reinforcement portions 52 extend from the arch portions 51 toward the inside in the axial direction to openings of the base holes 41 which are located inside in the axial direction. The reinforcement portions 52 are connected to the inner circumferential surfaces of the base holes 41.

In the vibration isolator 50 according to the present embodiment, the same operation and effects as the vibration isolator 40 according to the third embodiment can be produced.

The technical scope of the present invention is not limited to the above embodiments, and may be variously modified without departing from the spirit of the present invention.

For example, in the above embodiments, the restriction passage 21 is provided, but the restriction passage 21 may be omitted.

In the first and second embodiments, the partition plate parts 18 and 19 are formed in the spherical shapes, but the present invention is not limited thereto. For example, the partition plate parts 18 and 19 may be formed in conical shapes.

In the above embodiments, the communicating holes 22 are gradually reduced in diameter toward the inside in the axial direction, but the present invention is not limited thereto. For example, the communicating holes 22 may be gradually increased in diameter toward the inside in the axial direction.

Further, the communicating hole 22 may not be formed in the tapered shape extending in the axial direction. For example, the communicating hole 22 may be formed with the same diameter throughout the length in the axial direction, minimum and maximum inner diameters of the communicating hole 22 may match the inner diameter of the communicating hole 22. In this case, if the inner diameter of the communicating hole 22 is 3.6 mm or less, the minimum inner diameter of the communicating hole 22 may be set to 3.6 mm or less. In addition, as shown in FIG. 10, when the communicating hole 22 is not circular but polygonal (i.e., pentagonal as in FIG. 10), the smallest transverse distance of the communicating hole 22 on the straight line perpendicular to the hole axis L of the communicating hole 22 is defined as the inner diameter of the communicating hole 22. Even in this case, the minimum inner diameter of the communicating hole 22 can be set to 3.6 mm or less.

As the inner diameter of the communicating hole 22 having the pore shape is set to 3.6 mm or less, the force of the liquid circulating through the communicating holes 22 can be sufficiently weakened. Accordingly, it is possible to reduce an influence which the liquid exerts on the movable member 23.

As the movable member 23, a constitution different from that in the above embodiments may be employed. For example, the movable member 23 may be housed inside the housing chamber 20 to be displaceable in the axial direction, and another constitution in which the movable member 23 is housed inside the housing chamber 20 to be deformable or displaceable in the axial direction may be adequately employed.

In the aforementioned embodiments, the case in which the second mounting member 12 and the engine are connected and the first mounting member 11 and the vehicle body are connected has been described, but the present invention is not limited thereto. These components may be configured to be connected in reverse, and the vibration isolator 10 may be installed on another vibration generator and another vibration absorber.

Although preferred embodiments of the present invention have been described, the present invention is not limited to these embodiments. Additions, omissions, substitutions, and other modifications of the constitution are possible without departing from the spirit of the present invention. The present invention is not to be considered as being limited by the foregoing description, but is only limited by the appended claims.

Next, a verification test for the vibration isolators according to the aforementioned embodiments will be described.

In this verification test, as the vibration isolators, four vibration isolators including vibration isolators of Examples 1 to 3 and a vibration isolator of Comparative Example 4 were prepared. As the vibration isolator of Example 1, the vibration isolator 30 according to the second embodiment shown in FIG. 3 was employed. As the vibration isolator of Example 2, the vibration isolator 40 according to the third embodiment shown in FIG. 4 was employed. As the vibration isolator of Example 3, the vibration isolator 50 according to the fourth embodiment shown in FIG. 8 was employed. As the vibration isolator of Comparative Example 4, a constitution in which the partition plate parts 18 and 19 were replaced with the flat plate shape extending in the direction perpendicular to the central axis O in the vibration isolator 10 according to the first embodiment shown in FIG. 1 was employed.

In this verification test, vibration was input into the vibration isolator of each of Examples 1 to 3 and Comparative Example 4, and K (N/mm) was measured. Note that K is an absolute spring constant.

Figure 12:
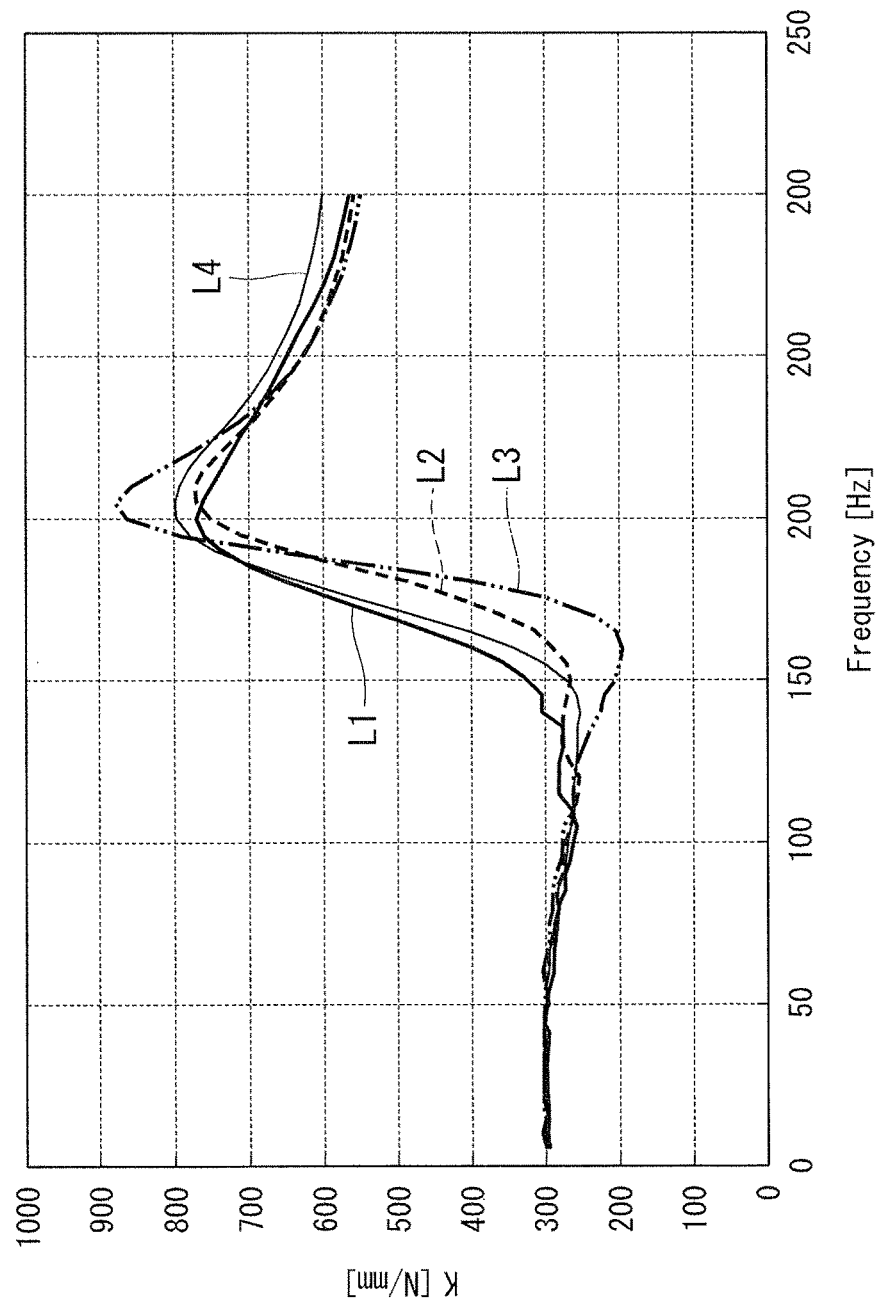
FIG. 12 is a graph showing results of a verification test.

The results are shown in a graph of FIG. 12. A transverse axis of the graph represents a frequency (Hz) of the input vibration, and a longitudinal axis of the graph represents K. Also, in the graph, graph lines L1, L2, L3, and L4 represent Example 1, Example 2, Example 3, and Comparative Example 4, respectively.

It was confirmed from the graph that in all vibration isolators, a value of K was maximized when the frequency of the input vibration was about 200 Hz. Thus, it was confirmed in Examples 1 and 2 that the maximum value of K was reduced compared to Comparative Example 4. In addition, it was confirmed in Example 3 that the value of K at the frequency exceeding 150 Hz just before it became the maximum value was reduced compared to the Comparative Example 4 as well as Examples 1 and 2.

What is claimed is:

1. A vibration isolator comprising:
    a first mounting member having a tubular shape and connected to one of a vibration generator and a vibration absorber, and a second mounting member connected to the other of the vibration generator and the vibration absorber;
    an elastic body configured to connect the first and second mounting members;
    a partition member disposed within the first mounting member and configured to partition a liquid chamber within which a liquid is enclosed into a primary liquid chamber using the elastic body as a part of a wall surface thereof and a secondary liquid chamber; and
    a movable member housed in a housing chamber provided within the partition member, the movable member being free to be deformed or displaced in an axial direction of the first mounting member,
    wherein the partition member comprises:
        first and second partition plate parts, the first partition plate part separating the housing chamber from the primary liquid chamber and the second partition plate part separating the housing chamber from the secondary liquid chamber,
        each of the first and second partition plate parts including
            an inner surface and an outer surface, a plurality of base holes formed in the inner surface of the partition plate part;

protrusions that protrude outwardly from the outer surface of the partition plate part, said protrusions being disposed to cover the plurality of base holes, and a plurality of communicating holes formed on the protrusions and exposed to the primary liquid chamber or the secondary liquid chamber, the plurality of communicating holes allow the liquid to pass through the protrusions, each of the protrusions includes multiple respective communicating holes of the plurality of communicating holes, the communicating holes are opened to the movable member through the base holes; and the each base hole and the multiple respective communicating holes forming a fluid passage from the inner surface of each of the partition plate parts to the outer surface of each of the partition plate parts;

the movable member being provided between the first partition plate part and the second partition plate part.

2. The vibration isolator of claim 1, wherein each of the base holes is circular when viewed along an axis of the first mounting member.

3. The vibration isolator of claim 1, wherein each of the base holes is hexagonal shaped when viewed along an axis of the first mounting member.

4. The vibration isolator of claim 1, wherein, in each of the protrusions, the multiple respective communicating holes are arrayed circumferentially around an axis of one base hole of the plurality of base holes.

5. The vibration isolator of claim 1, wherein each of the protrusions has a hemispherical shape that bulges outward.

6. The vibration isolator of claim 1, wherein each of the protrusions includes at least seven communicating holes.

7. The vibration isolator of claim 1, wherein the plurality of communicating holes form a honeycomb structure in each of the partition plate parts.

* * * * *